(12) United States Patent
Hils

(10) Patent No.: US 7,054,988 B2
(45) Date of Patent: May 30, 2006

(54) BUS INTERFACE FOR PROCESSOR

(75) Inventor: Andreas Hils, Unterhaching (DE)

(73) Assignee: LSI Logic Corporation, Milpitas, CA (US)

( * ) Notice: Subject to any disclaimer, the term of this patent is extended or adjusted under 35 U.S.C. 154(b) by 305 days.

(21) Appl. No.: 10/418,236

(22) Filed: Apr. 17, 2003

(65) Prior Publication Data

US 2004/0210703 A1    Oct. 21, 2004

(51) Int. Cl.
G06F 13/20 (2006.01)
G06F 13/36 (2006.01)

(52) U.S. Cl. ...................... 710/315; 710/313
(58) Field of Classification Search ........ 710/315, 710/306, 313
See application file for complete search history.

(56) References Cited

U.S. PATENT DOCUMENTS

| | | | |
|---|---|---|---|
| 5,553,249 A * | 9/1996 | Datwyler et al. | 710/307 |
| 5,873,119 A * | 2/1999 | Khandekar et al. | 711/169 |
| 6,064,626 A * | 5/2000 | Stevens | 365/233 |
| 6,308,241 B1* | 10/2001 | Simovich et al. | 711/118 |
| 6,425,071 B1* | 7/2002 | Lo et al. | 712/41 |
| 6,640,220 B1* | 10/2003 | Firlit et al. | 707/3 |
| 6,775,732 B1* | 8/2004 | Jahnke et al. | 710/306 |
| 6,799,264 B1* | 9/2004 | Goodhue et al. | 712/207 |
| 6,907,487 B1* | 6/2005 | Singh et al. | 710/305 |

* cited by examiner

Primary Examiner—Rehana Perveen
Assistant Examiner—Christopher A. Daley
(74) Attorney, Agent, or Firm—Christopher P. Maiorana, P.C.

(57) ABSTRACT

The present invention may generally provide a processor circuit comprising a processor, a first bus, a bus pipeline stage, and a second bus. The first bus may be coupled to the processor. The bus pipeline stage may be coupled between the first bus and the second bus and configured to delay an access between the first bus and the second bus at least one pipeline cycle.

19 Claims, 4 Drawing Sheets

ACCESS DELAYS

ACCESS DELAYS

BUS INTERFACE FOR PROCESSOR

FIELD OF THE INVENTION

The present invention may relate generally to the field of processors, for example, pipelined processors, and to a bus interface for a pipelined processor. The invention may be applied to a circuit including a pipelined processor core interfaced via a bus to one or more peripheral circuits, such as memories. The invention is especially suitable for implementation in an integrated circuit.

BACKGROUND TO THE INVENTION

A conventional pipelined processor has multiple processor stages coupled in a pipeline. Data progresses from one processor stage to the next on each pipeline cycle. For example, a three-stage pipeline processor has a first fetch stage for fetching data or instruction information from a peripheral circuit outside the processor, a second execution stage for executing an instruction using the fetched information, and a third write (or "write-back") stage for writing processed data to a peripheral circuit outside the processor. An example of a three-stage pipelined processor is the ARM7TDMI processor from ARM Ltd. of Cambridge, Great Britain.

In certain applications the pipeline speed is limited not by the processor, but by the arrangement of peripheral circuits and a bus interface between the peripheral circuits and the processor. The term "bus interface" is commonly used to mean any of the bus or circuit elements between the processor and the peripheral circuits. The pipeline cannot be clocked at a rate higher than that supportable by the arrangement of the peripheral circuits and the bus interface. In particular, the peripheral circuits and the interfacing bus should handle accesses within the timing of the pipeline cycles. One situation in which the timing can be problematic is when the peripheral circuit is on a different peripheral bus from a native bus coupled directly to the processor. Another situation is when the peripheral circuit has a slow access response time, as do many "slow" memories. In the case of both a slow access response time and a different peripheral bus, the problem of timing can severely limit the maximum pipeline speed supportable.

A cache is included on the native bus to attempt to reduce data transfer overhead to the peripheral circuits and/or to other buses. However, a cache significantly complicates the design and timing problems for the bus interface. For example, conventional cache designs suspend an access to a peripheral circuit while the cache determines whether the access is cached. In the event of a cache-miss (i.e., an addressed location is not cached), the cache must execute a late bus access to the peripheral circuit. Suspending the bus access necessarily increases the overall time required to perform the access, and further reduces the maximum pipeline speed that can be supported. Alternatively, the cache can initiate the bus access to the peripheral circuit without suspending while simultaneously determining whether the access is cached. Such a configuration is referred to as a zero wait-state cache. In the event of a cache-hit (i.e., an addressed location is cached) the cache must be able to abort the initiated bus access to the peripheral circuit. However, not all buses can accommodate access aborts, limiting the applications for zero wait-state caches. For example, the protocol for the AMBA standard High-performance Bus (AHB) from ARM Ltd. does not support access aborts. Handling access aborts is also highly problematic if the peripheral circuit is on a different bus from the native bus to which the cache is coupled.

Many processing applications demand that the processor core be operated at as high a speed as possible. However, in applications in which the above timing constraints limit the maximum pipeline speed that the peripheral circuits and the bus interface can support, the circuits do not realise the full performance potential of the processor.

SUMMARY OF THE INVENTION

The present invention may generally provide a circuit comprising a processor, a first bus, a bus pipeline stage, and a second bus. The first bus may be coupled to the processor. The bus pipeline stage may be coupled between the first bus and the second bus and configured to delay an access between the first bus and the second bus by at least one pipeline cycle.

Advantages, features and objects of the present invention may include: (i) decoupling the timing of a bus for peripheral circuits from the timing of a processor native bus; (ii) enabling peripheral circuits to be designed more independently of a processor core; (iii) enabling an increase in a pipeline bus speed supportable by a bus interface circuit and peripheral circuits; (iv) spreading access delays to peripheral circuits over a plurality of pipeline cycles; and/or (v) enabling a zero wait-state cache or other memory circuit to be implemented on a processor native bus while avoiding problems of accommodating access aborts within a bus protocol. Other advantages, features and objects of the invention will be apparent from the following description, claims and/or drawings.

BRIEF DESCRIPTION OF THE DRAWINGS

Non-limiting preferred embodiments of the invention are now described, by way of example only, with reference to the appended claims and accompanying drawings, in which:

DETAILED DESCRIPTION OF PREFERRED EMBODIMENTS

Figure 1:
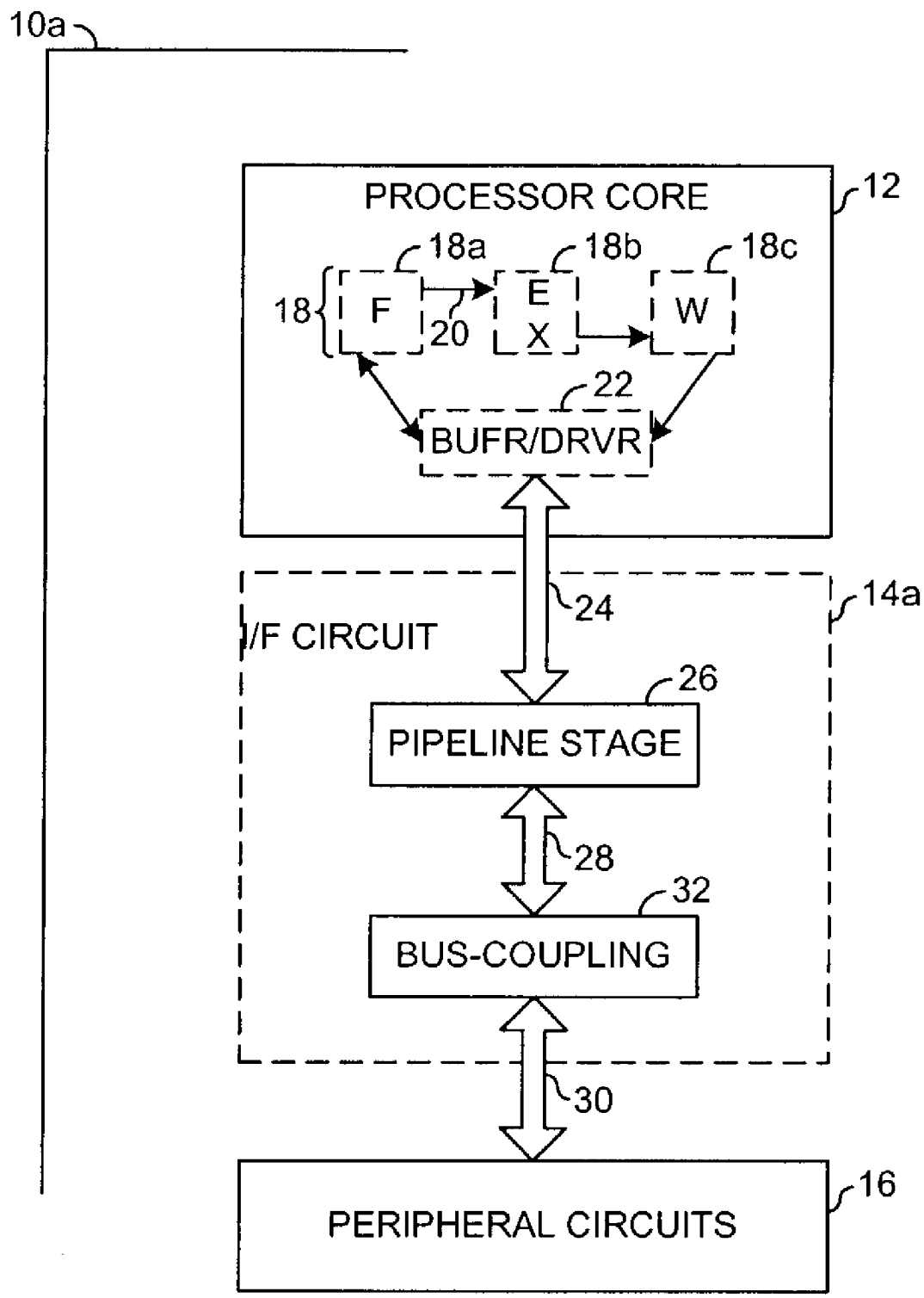
FIG. 1 is a schematic block diagram of a first embodiment of the invention.

Referring to FIG. 1, an integrated circuit 10a may generally comprise a processor core 12 coupled via a bus interface circuit 14a to one or more peripheral circuits 16. The peripheral circuits 16 may be within the integrated circuit 10a. The peripheral circuits 16 may be referred to as peripheral if they are not part of the standard circuitry of the processor core 12. For example, the peripheral circuits 16 may comprise any of read-only memories, read/write memories, and interface circuits for interfacing with off-chip circuits not in the integrated circuit 10a.

The processor core 12 may be configured as a pipelined processor. The processor core 12 may generally comprise a plurality of processor stages 18 cascaded in a pipeline 20. For example, the processor core 12 may be a three-stage pipelined processor. A first processor stage 18a may be configured as a fetch stage for performing a read access to the peripheral circuits 16 to fetch or read information into the processor core 12. The information may be an instruction or processed data. A second processor stage 18b may be configured as an execution stage for executing an instruction. A third processor stage 18c may be configured as a write stage for performing a write access to the peripheral circuits 16 to write information from the processor core 12 to the accessed peripheral circuit 16. The processor core 12 may further comprise bus buffer/driver circuitry 22 coupled between each of the first and third processor stages 18a, 18c and the interface circuit 14a. Each processor stage 18a–c may execute within a single pipeline cycle.

The bus interface circuit 14a may include any busses and/or circuitry for coupling the interface circuits 16 to the processor core 12. The bus interface circuit 14a may generally comprise a first bus 24, a bus pipeline stage 26, a second bus 28, a bus-coupling stage 32 and a third bus 30. The first bus 24 may be a native bus for the processor core 12 and may be coupled to the processor core 12. The second bus 28 may be a pipelined version of the native bus. The second bus 28 may carry the same access information as the first bus, but delayed by one or more of the pipeline cycles. Each pipeline cycle delay for the bus pipeline stage 26 may be the same as the duration of the pipeline cycle for the processor core 12. The second bus 28 may be of the same bus type, and have the same bus protocol, as the first bus 24. The peripheral circuits 16 may be coupled directly to the second bus 28 (not shown). However, in the illustrated embodiment, the peripheral circuits 16 may be coupled to the third bus 30. The third bus 30 may be of a different bus type and/or have a different bus protocol from the first and second busses 24 and 28. Using a different bus for the third bus 30 generally enables a design of the third bus 30 to be specific for an application or environment, irrespective of the native bus 24 associated with the processor core 12. The third bus 30 coupling the peripheral circuits 16 may therefore not be constrained by the native bus 24. For example, the third bus may be an AMBA High-performance Bus (AHB) bus according to the open AMBA standard hereby incorporated by reference in its entirety. The third bus 30 may be coupled to the bus pipeline stage 26 via the bus-coupling circuit 32 and the second bus 28. The bus coupling circuit 32 may translate, add and/or remove signals passing between the second and third buses 28 and 30, to interface the bus protocols together.

The bus pipeline stage 26 may function to delay an access or transfer from the processor core 12 to the third bus 30 by one or more pipeline cycles. Delaying may span two or more pipeline cycles to perform the access. An unexpected advantage of such an operation is that access delays inherent in each access operation (and which may determine the maximum pipeline speed supportable) may be spread over plural pipeline cycles. Such an advantage may be illustrated by comparing an operation of the first embodiment with a comparative example embodiment illustrated in FIG. 2.

Figure 2:
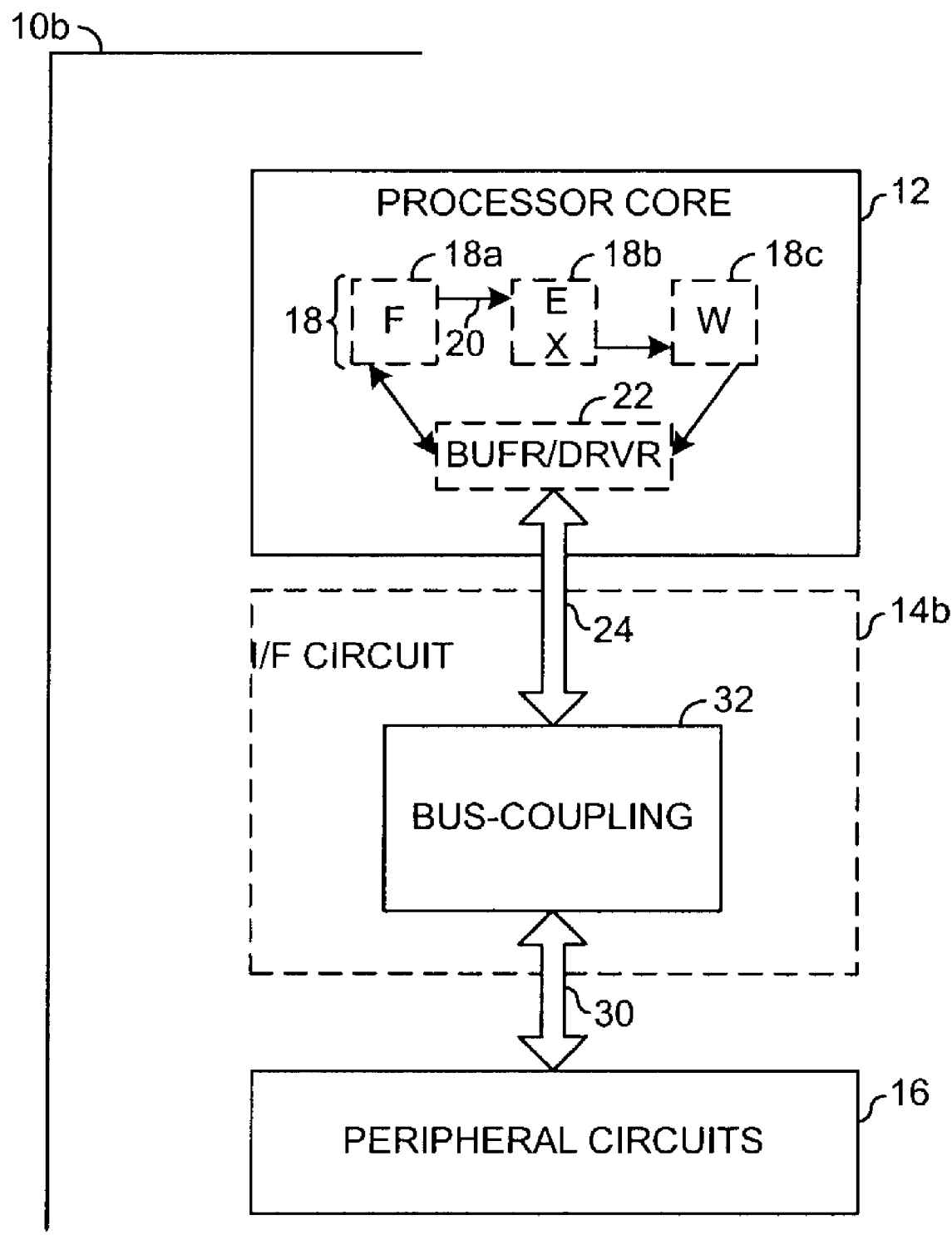
FIG. 2 is a schematic block diagram of a comparative example embodiment.

Referring to FIG. 2, the same reference numerals may denote the same features as those of the first embodiment. The comparative example integrated circuit 10b may include the same circuit elements as those of the first integrated circuit 10a, except that the bus pipeline stage 26 and the second bus 28 may be omitted from the interface circuit 14b. Instead, the bus-coupling circuit 32 may couple the third bus 30 to the first native bus 24.

Figure 3:
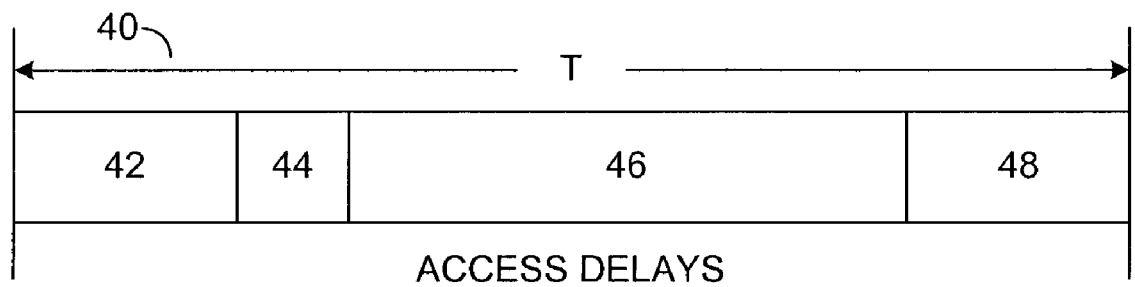
FIG. 3 is a schematic timing diagram for the comparative example illustrating typical delay timings for accesses to peripheral circuits.

FIG. 3 illustrates typical timing delays for a bus access from the processor core 12 in the comparative example of FIG. 2. In FIG. 3, the representation and order of the delays is purely schematic for the whole access cycle, and may not represent a precise order in which the delays may be encountered during the access cycle. Without the bus pipeline stage 26, the third bus 30 may be constrained by the timing of the first bus 24 since there may be no pipeline effect between the first and third busses 24 and 30. The first bus 24 may be the native bus, which operates at the same timing as the processor pipeline 20. In FIG. 3, each bus cycle (e.g., pipeline cycle) 40 has a period T. Delays during an access cycle may be caused by one or more of: (i) an access response time 42 of the peripheral 16; (ii) bus-coupling delays 44 at the bus-coupling circuit 32; (iii) core delays 46 caused by the bus buffer/driver circuitry 22 in the processor core 12; and (iv) bus delays 48 caused by multiplexing and buffering (not shown) in the third bus 30, which may extend widely across the integrated circuit. For a typical implementation, the access response time 42 for address decoding in a static memory (e.g., SRAM) may be about 2 nanoseconds (ns). The bus-coupling delays 44 at the bus coupling circuit 32 may be about 1 ns. The core delays 46 in the bus buffer/driver circuitry 22 may be about 5 ns. The bus delays 48 on the third bus 30 may be about 2 ns. The total delay for an access may therefore be about 10 ns, which sets the minimum access period T that the peripheral circuits 16 and the bus interface circuit 14b can support. A minimum access period (e.g., pipeline cycle) of 10 ns may be equivalent to a maximum pipeline clock frequency of 100 MHz in the processor pipeline 20. Therefore, even though a typical pipeline processor core 12 may be capable of being run at much higher pipeline speeds (for example, 150 MHz to 200 MHz or higher), the arrangement of the bus interface circuit 14b of the comparative example (FIG. 2) may limit the pipeline speed to 100 MHz.

Figure 4:
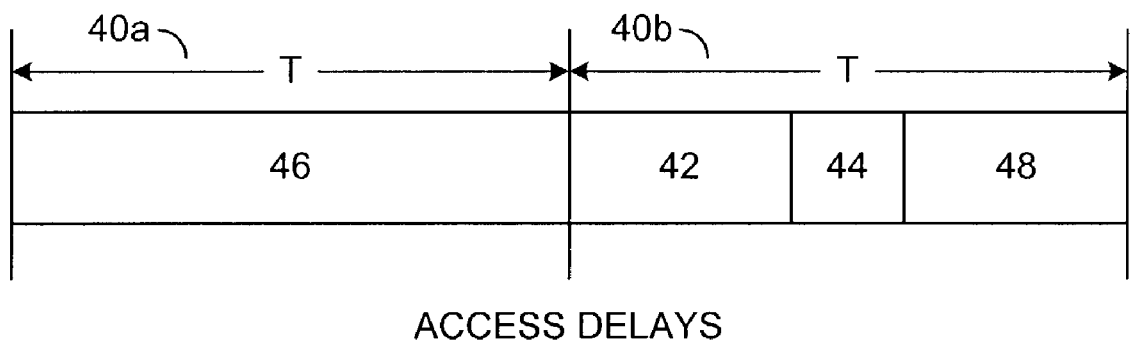
FIG. 4 is a schematic timing diagram for the first embodiment illustrating equivalent typical delay timings for accesses to peripheral circuits.

FIG. 4 illustrates the equivalent typical timing delays for a bus access from the processor core 12 in the first embodiment. The format of FIG. 4 is similar to that of FIG. 3. As explained above, the effect of the bus pipeline stage 26 may be that an access from the processor 12 to the peripheral circuits 16 may take multiple pipeline cycles of the pipeline 20 (e.g., two cycles 40a and 40b). Therefore, the delays 42–48 may be spread across multiple pipeline cycles, allowing each pipeline cycle to be completed more quickly (e.g., shorter). For example, on the first pipeline cycle 40a, the access may be communicated from the processor core 12 via the first bus 24 to the bus pipeline stage 26. During the first pipeline cycle 40a, the access may be delayed by the core delay 46 (typically 5 ns in the comparative example). On the second pipeline cycle 40b following the first pipeline cycle 40a, the access may be communicated from the bus pipeline stage 26 via the second bus 28, the bus-coupling circuit 32 and the third bus 30 to the peripheral circuits 16. During the second pipeline cycle 40b, the access may be delayed by the access response 42 of the peripheral circuit 16 (typically 2 ns in the comparative example), the bus coupling delays 44 (typically 1 ns in the comparative example), and the third bus 30 delays 48 (typically 2 ns in the comparative example). However, within each individual pipeline cycle 40a, 40b, the total delay may be only about 5 ns, which may set the minimum access period T that the peripheral circuits 16 and the bus interface circuit 14a can support. A minimum access period (e.g., pipeline cycle) of 5 ns may be equivalent to a maximum pipeline clock frequency of 200 MHz. Therefore, the arrangement of the first embodiment may enable the pipeline frequency to be significantly increased compared to the comparative example. The pipeline frequency may be increased even though the circuit may experience the same inherent delays 42–48 as the comparative example.

The above figures (amounts) for the delay times 42–48 may be purely schematic for illustrating operations and advantages of the first embodiment compared to the comparative example. The figures do not limit the invention. The sizes of delays may vary according to the implementation.

The effect of the bus pipeline stage 26 may be that an access from the processor 12 to the peripheral circuits 16 may occupy two (or more) pipeline cycles. However, despite an access occupying multiple pipeline cycles, the facilitation of an equivalent increase in the pipeline speed may enable the access to be completed in not significantly longer than in the comparative example. For example, increasing the pipeline speed (e.g., from 100 MHz to 200 MHz) may mean that two pipeline cycles of the first embodiment may take not significantly longer than (e.g., the same time as) a single pipeline cycle of the comparative example.

Figure 5:
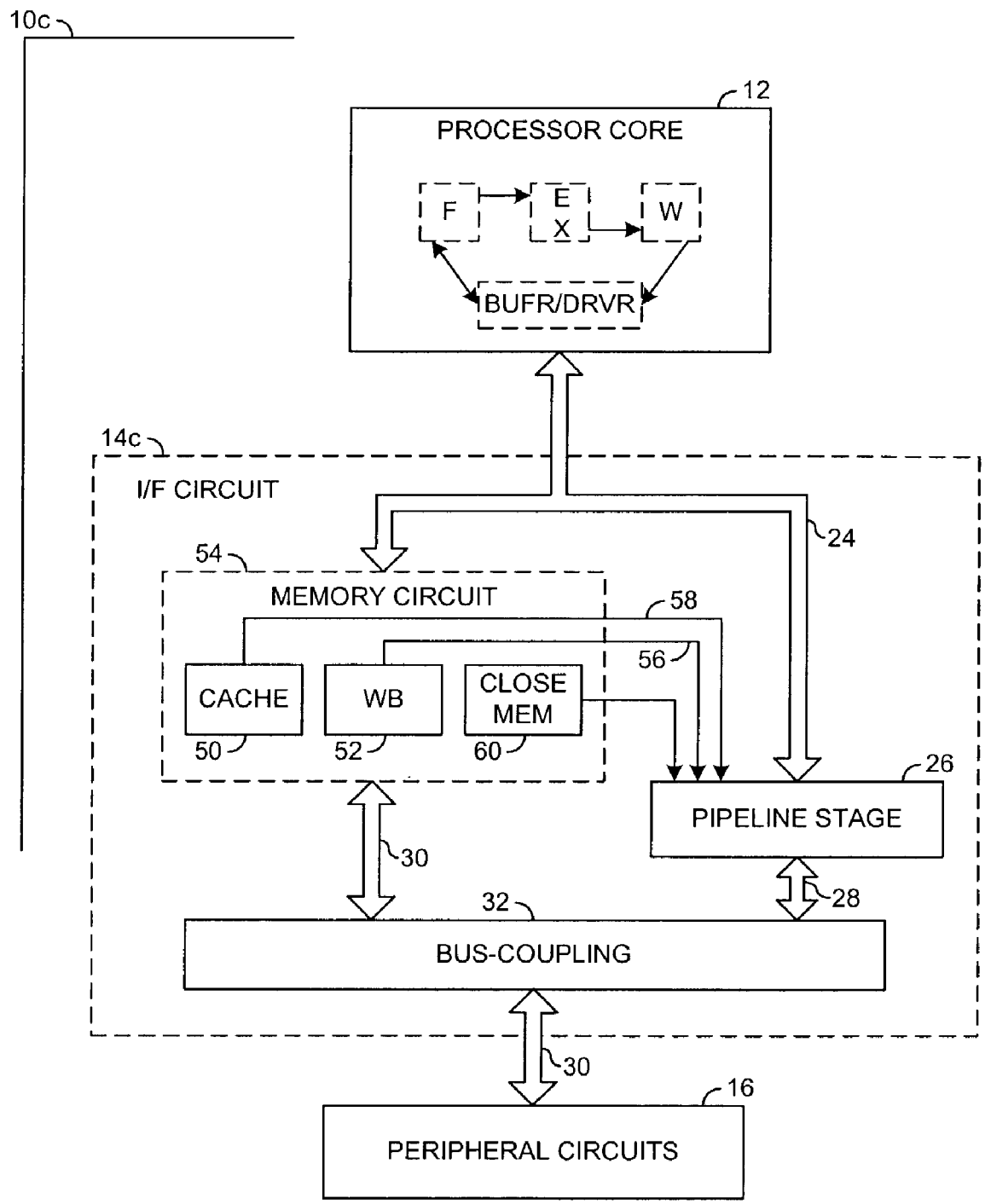
FIG. 5 is a schematic block diagram of a second embodiment of the invention.

FIG. 5 illustrates a second embodiment of the invention. The same reference numerals may denote equivalent features to those of the first embodiment. The second integrated circuit 10c may be similar to the first integrated circuit 10a, except that the bus interface circuit 14c may further comprise a memory circuit 54. The memory circuit 54 may be directly coupled to the first bus 24 in parallel with the bus pipeline stage 26, between the processor core 12 and the bus-coupling circuit 32. For example, the memory circuit 54 may comprise a cache 50 and/or a write buffer 52. Implementing the cache 50 and the write buffer 52 in parallel with the bus pipeline stage 26 may enable many of the problems associated with a cache to be overcome. The bus pipeline stage 26 may provide additional processing time for the cache 50 and the write buffer 52 to process the access from the processor core 12 before the access may be due to communicated to the third bus 30.

By way of example, a write access may be communicated during a first pipeline cycle to both the write buffer 52 and the bus pipeline stage 26, via the first native bus 24. The write buffer 52 may process (e.g., decode) the access during the first pipeline cycle. The bus pipeline stage 26 may be responsive on a next pipeline cycle to a first control signal 56 asserted by the write buffer 52 indicating whether or not the write access may be handled by the write buffer 52. When the write access may not be handled by the write buffer 52, the first control signal 56 may control the bus pipeline stage 26 to communicate the access on the second pipeline cycle to the third bus 30, in a similar manner to the first embodiment. When the write access may be handled by the write buffer 52, the first control signal 56 may control the bus pipeline stage 26 not to communicate the write access to the third bus 30. The write access, therefore, may not reach the third bus 30. Since the write access may not reach the third bus 30, the problems of access aborts on the third bus 30 may be completely avoided. Also, compared to the speed of the first integrated circuit 10a, inclusion of the write buffer 52 may have no impact on the speed at which write accesses are communicated to the third bus 30 in the event that the write buffer 52 may not handle the write access.

Similarly, during a first pipeline cycle, a read access may be communicated in parallel via the native bus 24 to both the cache 50 and the bus pipeline stage 26. In a similar manner to that described for a write access, the cache 50 may process (e.g., decode) the access during the first pipeline cycle. The bus pipeline stage 26 may be responsive on the next pipeline cycle to a second control signal 58 asserted by the cache 50 indicating whether or not the read access may be handled by the cache 50. When the read access may not be handled by the cache 50, the second control signal 58 may control the bus pipeline stage 26 to communicate the access on the second pipeline cycle to the third bus 30, in a similar manner to the first embodiment. When the read access may be handled by the cache 50, the second control signal 56 may control the bus pipeline stage 26 not to communicate the read access to the third bus 30. The read access therefore may not reach the third bus 30. Since the read access may not reach the third bus 30, the problems of access aborts on the third bus 30 may be completely avoided. Also, if the cache 50 can handle the read access, the read access may be processed completely in a single pipeline cycle, to allow the cache 50 to provide a further speed advantage compared to an access to the peripheral circuits 16. Compared to the speed of the first integrated circuit 10a, inclusion of the cache 50 may have no impact on the speed at which read accesses are communicated to the third bus 30 in the event that the cache 50 may not handle the read access.

In addition, or as an alternative, to the cache 50 and/or the write buffer 52, the memory circuit 54 may comprise a tightly coupled memory 60 directly addressable by the processor core 12. In contrast to the cache 50 and/or the write buffer 52 which may have non-dedicated addresses that may act as a window on the peripheral circuits 16, the tightly coupled memory 60 may have dedicated addressing, to act as an independent fast memory that may not be slowed by addressing through the third bus 30. The tightly coupled memory 60 may operate to process read accesses and write accesses in a single pipeline cycle. If the read or write access may be handled by the tightly coupled memory 60, the second control signal 56 may control the bus pipeline stage 26 not to communicate the access to the third bus 30. In a similar manner to the cache 50 and/or the write buffer 52, inclusion of the tightly coupled memory 60 may have no impact on the speed of accesses to the peripheral circuits 16.

As illustrated by the embodiments, the inclusion of at least one bus pipeline stage 26 may enable the bus timing for peripheral circuits 16 and an associated bus 30 to be decoupled from the timing of the native bus 24 coupled to the processor core 12. Decoupling of the bus timing may enable a greater pipeline speed (e.g., frequency) to be supported. An increase in the number of pipeline cycles required to perform an access may be compensated for by the equivalent increase in the supported pipeline speed. The bus pipeline stage 26 may also enable a zero wait-state cache to be implemented efficiently without the concerns of handling access aborts within a bus protocol.

The foregoing description is merely illustrative of preferred forms and preferred features of the invention. Many developments, modifications and equivalents may be used within the scope and principles of the invention. Accordingly, the claims are intended to cover all such developments, modifications and equivalents.

The invention claimed is:

1. A circuit comprising:
  a processor operating at a first clock rate;
  a first bus coupled to said processor;
  a second bus; and
  a bus pipeline stage (i) operating at a second clock rate, (ii) coupled between said first bus and said second bus and (iii) configured to delay an access between said first bus and said second bus by adding one or more pipeline cycles, wherein said second clock rate is sufficiently faster than said first clock rate to compensate for said added pipeline cycles.

2. The circuit according to claim 1, wherein said processor is a pipelined processor executing a plurality of stages each said processor cycle.

3. The circuit according to claim 1, wherein said second bus is the same bus type and has a same bus protocol as said first bus.

4. The circuit according to claim 1, wherein said first bus is a native bus of said processor operating at the same timing as said processor, and said second bus is a pipelined version of said native bus.

5. The circuit according to claim 1, further comprising a memory circuit directly coupled to said first bus in parallel with said bus pipeline stage.

6. The circuit according to claim 1, wherein said circuit is implemented in an integrated circuit and said processor comprises a processor core of said integrated circuit.

7. The circuit according to claim 1, wherein said second bus transfers the same access information as said first bus, but delayed by one or more of said pipeline cycles.

8. The circuit according to claim 1, wherein said second clock rate is double the speed of said first clock rate.

9. The circuit according to claim 5, wherein said memory circuit is configured to control said bus pipeline stage not to communicate said access from said first bus to said second bus.

10. The circuit according to claim 5, wherein said memory circuit comprises (i) a cache, (ii) a write buffer or (iii) a tightly coupled memory directly addressable by said processor.

11. A circuit comprising:
- a processor (i) operating at a first clock rate and (ii) having a first bus protocol;
- a first bus coupled to said processor;
- a second bus;
- a bus pipeline stage (i) operating at a second clock rate, (ii) coupled between said first bus and said second bus and (iii) configured to delay an access between said first bus and said second bus one or more pipeline cycles;
- a bus-coupling circuit coupled to said second bus;
- a third bus connected to said bus pipeline stage through said bus-coupling circuit and said second bus, wherein said third bus is a different bus type and has a different bus protocol than said second bus; and
- a peripheral circuit connected to said third bus.

12. The circuit according to claim 11, wherein said third bus is specifically designed to an application or environment of said peripheral circuit.

13. The circuit according to claim 11, wherein said bus coupling circuit performs one or more of (i) translating, (ii) adding and (iii) removing signals passing between said second bus and said third bus.

14. The circuit according to claim 11, wherein said third bus has a same bus timing as said second bus.

15. The circuit according to claim 11, wherein said third bus is an AMBA High-performance Bus (AHB).

16. The circuit according to claim 11, further comprising at least one peripheral circuit coupled to said third bus.

17. The circuit according to claim 11, wherein said bus pipeline stage decouples the timing of said peripheral circuit and said third bus from said processor and said first bus.

18. A circuit comprising:
- a processor operating at a first clock rate;
- a first bus coupled to said processor;
- a second bus; and
- a bus pipeline stage (i) operating at a second clock rate, (ii) coupled between said first bus and said second bus and (iii) configured to delay an access between said first bus and said second bus one or more pipeline cycles, wherein access delays in an access operation are spread over a plurality of pipeline cycles.

19. The circuit according to claim 16, wherein said peripheral circuit comprises a memory circuit.

* * * * *